Patented May 9, 1950

2,507,253

UNITED STATES PATENT OFFICE 2,507,253

STABILIZATION OF SENSITIVITY OF METALLIC TITANATE PIEZOELECTRIC ELEMENTS

Glenn N. Howatt, Metuchen, N. J., assignor to Gulton Mfg. Corp., Metuchen, N. J., a corporation of New Jersey No Drawing. Application May 1, 1948, Serial No. 24,664

12 Claims. (Cl. 171—327)

My invention relates to the treatment of metallic titanates of the type which exhibit piezo-electric properties.

The metallic titanates are ceramic bodies which are usually utilized, for their piezo-electric properties, in the form of thin sheet-like elements having a thickness in the range of approximately 0.001 inch to 0.080 inch. In general, such titanates are derived from metals of group IIA of the periodic system. Typical examples of the titanates with which my present invention deals are barium titanate, strontium titanate, calcium titanate, magnesium titanate, aluminum titanate, manganese titanate, the rare earth metal titanates, and mixtures of any two or more thereof. From a practical standpoint, barium titanate bodies and bodies in which the barium titanate predominates in amount over other titanates present are the most satisfactory of the metallic titanates for use as piezo-electric elements and, therefore, my invention is particularly concerned therewith. In the thin sheet forms in which the metallic titanates are produced, the structure of the titanates is polycrystalline. However, the titanates may be produced as single crystals and my invention, described hereafter in detail, is applicable to the treatment of the titanates either in the form of polycrystalline or monocrystalline elements.

While metallic titanates, particularly barium titanate, have certain important advantages over other piezo-electric materials such as Rochelle salt crystals, they suffer the disadvantage of losing a relatively substantial degree of their sensitivity over a period of time. Thus, for example, barium titanate ceramic bodies may lose as much as 30% of their sensitivity over a period of approximately five to six months. In the design of equipment which utilizes such elements, therefore, account must be taken of this characteristic, a factor which introduces complications, higher costs, and other undesired problems.

I have found that the sensitivity characteristics of the metallic titanates may be "stabilized" so that they remain substantially constant over very prolonged periods of time. More specifically, I have discovered that if the metallic titanates are subjected to a certain heat treatment procedure, a sensitivity is acquired which remains substantially constant over practically indefinite periods of time.

The heat treatment comprises subjecting the metallic titanates in an electrically charged condition, preferably in the form of thin sheet-like bodies, for example, from about 0.001 to about 0.080 inch thick, to a temperature falling within the range of just below the Curie point of the particular titanate body involved to approximately 15 degrees C. below said Curie point for a substantial period of time, usually a matter of at least several hours, preferably followed by cooling or allowing the body to cool, either slowly or by shock cooling. The temperature and time of treatment may vary, generally, in inverse ratio to each other. In the case of barium titanate, for example, the Curie point of which is 116 degrees C., the heat treatment may be effected at temperatures ranging from about 100 degrees C. to 115 degrees C. for from 3 to 4 hours after which the body may be cooled or allowed to cool down, for example, to room temperature or below if such is desired for any particular reason. In any event, it is essential that the heating be carried out below the Curie point since, otherwise, the piezo-electric properties of the titanate body will be destroyed. It is most advantageous to effect the heat treatment at temperatures as close to the Curie point as possible since the greatest degree of stability is thereby obtained. For good results, however, it is sufficient if the temperature of treatment falls anywhere within not appreciably less than 15 degrees C. below the Curie point to just below the Curie point. Any suitable equipment may be used for carrying out the heat treatment as, for example, ovens having proper temperature and atmosphere control means, boiling water-bath apparatus, baths containing heated materials, such as mineral oils, in which the elements may be directly immersed and which are inert to said elements, etc. In certain instances, I find it advantageous to carry out the heat treatment in an atmosphere of pure or substantially pure oxygen.

It will be understood that the various metallic titanates have different Curie points. Some of them, for example, strontium titanate, have Curie points substantially below zero degrees C. As a practical proposition, from the standpoint of normal commercial operations, it is advisable to work with those titanates which exhibit piezoelectric properties and which have Curie points at relatively elevated positive temperatures, barium titanate being an outstanding example thereof. In any event, the principles of my present invention are of applicability generally to the metallic titanates which possess piezoelectric properties.

The production of metallic titanate bodies in the form of thin sheets is shown, for example, in my copending applications Serial No. 554,295 now abandoned, filed September 15, 1944, and Serial No. 607,241 now U. S. Patent 2,486,410, filed July 26, 1945. Methods of charging said bodies are known and have been described, for example, in the July 1947 issue of Physical Review. I make no claim in the present application to methods of preparing the metallic titanate thin sheet bodies nor to methods of charging the same to impart piezo-electric properties thereto.

What I claim as new and desire to protect by Letters Patent of the United States is:

1. In a method of treating electrically charged metallic titanate piezo-electric elements to render them substantially stable with respect to their sensitivity over long periods of time, the step which comprises heating said charged elements to a temperature within the range of just below the Curie point to approximately 15 degrees C. below the Curie point.

2. In a method of treating titanates of metals which possess piezo-electric properties and which are selected from the group consisting of titanates of barium, strontium, calcium, magnesium, aluminum, manganese, rare earth metals and mixtures thereof, to render them substantially stable with respect to their sensitivity over long periods of time, the steps which comprise subjecting said titanates, in the form of thin sheet-like members and in an electrically charged condition, to a heat treatment for several hours at a temperature falling within the range of just below the Curie point to approximately 15 degrees C. below the Curie point, and then allowing said members to cool to room temperature.

3. In a method of treating electrically charged barium titanate piezo-electric elements to render them substantially stable with respect to their sensitivity over long periods of time, the steps which comprise heating said charged elements to a temperature within the range of just below the Curie point to approximately 15 degrees C. below the Curie point for at least several hours, and then allowing said elements to cool.

4. In a method of treating barium titanate elements which possess piezo-electric properties to render them substantially stable with respect to their sensitivity over long periods of time, the steps which comprise subjecting said elements, in the form of members having a thickness in the range of about 0.001 inch to 0.080 inch and in an electrically charged condition, to a heat treatment for several hours at a temperature falling within the range of just below the Curie point to approximately 15 degrees C. below the Curie point, and then allowing said elements to cool to room temperature.

5. In a method of treating electrically charged barium titanate piezo-electric elements to render them substantially stable with respect to their sensitivity over long periods of time, the steps which comprise heating said charged elements to a temperature within the range of about 100 degrees C. to 115 degrees C. for about 3 to about 4 hours, and then allowing said elements to cool to room temperature.

6. In a method of treating barium titanate elements which possess piezo-electric properties to render them substantially stable with respect to their sensitivity over long periods of time, the steps which comprise subjecting said elements, in the form of members having a thickness in the range of about 0.001 inch to 0.080 inch and in an electrically charged condition, to a heat treatment for about 3 to about 4 hours at a temperature falling within the range of about 100 degrees C. to 115 degrees C., and then allowing said elements to cool to room temperature.

7. The method of claim 3 wherein the heating is carried out in an atmosphere consisting mainly of free oxygen.

8. The method of claim 6 wherein the heating is carried out in an atmosphere consisting mainly of free oxygen.

9. A metallic titanate piezo-electric element which is substantially stable with respect to its sensitivity over long periods of time, comprising the product resulting from the heat treatment of an electrically charged metallic titanate element at a temperature within the range of just below the Curie point to approximately 15 degrees C. below the Curie point.

10. A metallic titanate piezo-electric element which is substantially stable with respect to its sensitivity over long periods of time, comprising the product resulting from subjecting a metallic titanate element, in the form of a member having a thickness in the range of about 0.001 inch to 0.080 inch and in an electrically charged condition, to a heat treatment for several hours at a temperature falling within the range of just below the Curie point to approximately 15 degrees C. below the Curie point, and then allowing said element to cool.

11. A barium titanate piezo-electric element which is substantially stable with respect to its sensitivity over long periods of time, comprising the product resulting from the heat treatment of an electrically charged barium titanate element at a temperature within the range of just below the Curie point to approximately 15 degrees C. below the Curie point for at least several hours followed by allowing said element to cool to room temperature.

12. A barium titanate piezo-electric element which is substantially stable with respect to its sensitivity over long periods of time, comprising the product resulting from subjecting a barium titanate element, in the form of a member having a thickness in the range of about 0.001 inch to 0.080 inch and in an electrically charged condition, to a heat treatment for several hours at a temperature falling within the range of just below the Curie point to approximately 15 degrees C. below the Curie point, and then allowing said element to cool to room temperature.

GLENN N. HOWATT.

No references cited.